United States Patent [19]

Wenninger

[11] 3,901,091

[45] Aug. 26, 1975

[54] SAFETY STEERING WHEEL FOR VEHICLES

[75] Inventor: Josef Wenninger, Vorsfelde, Germany

[73] Assignee: Volkswagenwerk Aktiengesellschaft, Wolfsburg, Germany

[22] Filed: Oct. 9, 1973

[21] Appl. No.: 404,350

[30] Foreign Application Priority Data
Oct. 21, 1972 Germany............................ 2251791

[52] U.S. Cl..................................... 74/552; 188/1 C
[51] Int. Cl.²........................................... B62D 1/04
[58] Field of Search............... 74/492, 552; 188/1 C; 280/150 B

[56] References Cited
UNITED STATES PATENTS

| | | | |
|---|---|---|---|
| 2,814,211 | 11/1957 | Hoagg | 74/552 |
| 3,456,526 | 7/1969 | Brilmyer | 74/552 |
| 3,561,286 | 2/1971 | Edge et al. | 74/552 |
| 3,596,532 | 8/1971 | Wilfert | 74/552 |
| 3,714,844 | 2/1973 | Tsuda | 74/522 |

*Primary Examiner*—Allan D. Herrmann
*Attorney, Agent, or Firm*—Ernest F. Marmorek

[57] ABSTRACT

A safety steering wheel for vehicles which includes an energy absorbing deformation member. The deformation member is integrally connected to the spokes of the steering wheel and preferably consists of sheet metal extending over both the spokes and the hub of the steering wheel. The lateral edges of the sheet metal are connected with the spokes. The sheet metal which forms the deformation member may have a U-shaped cross-section and may be provided with rhombic-like cutouts.

4 Claims, 5 Drawing Figures

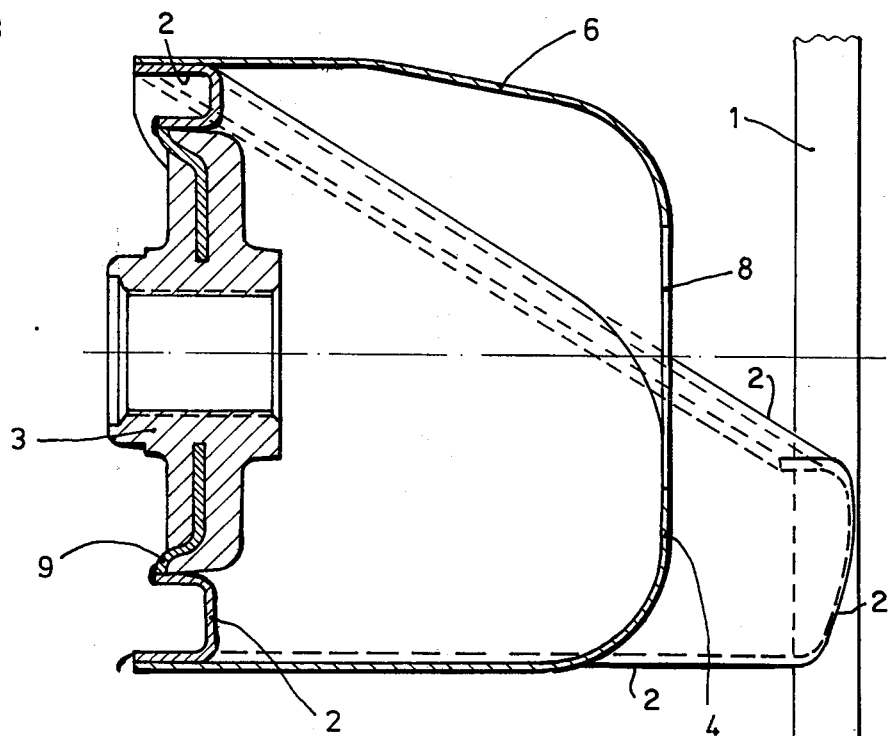
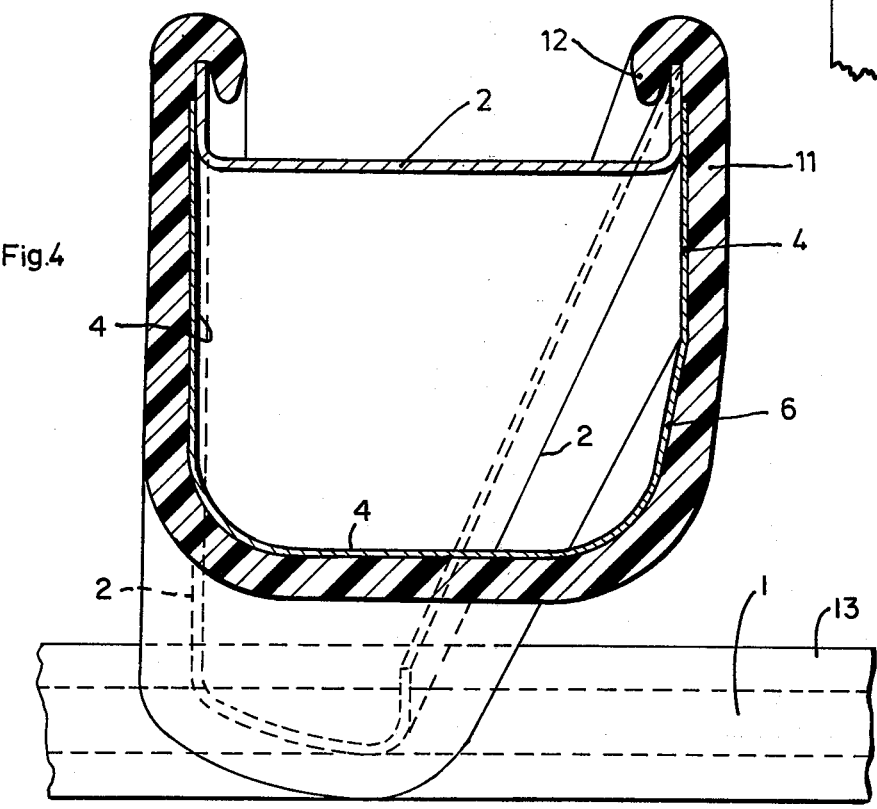

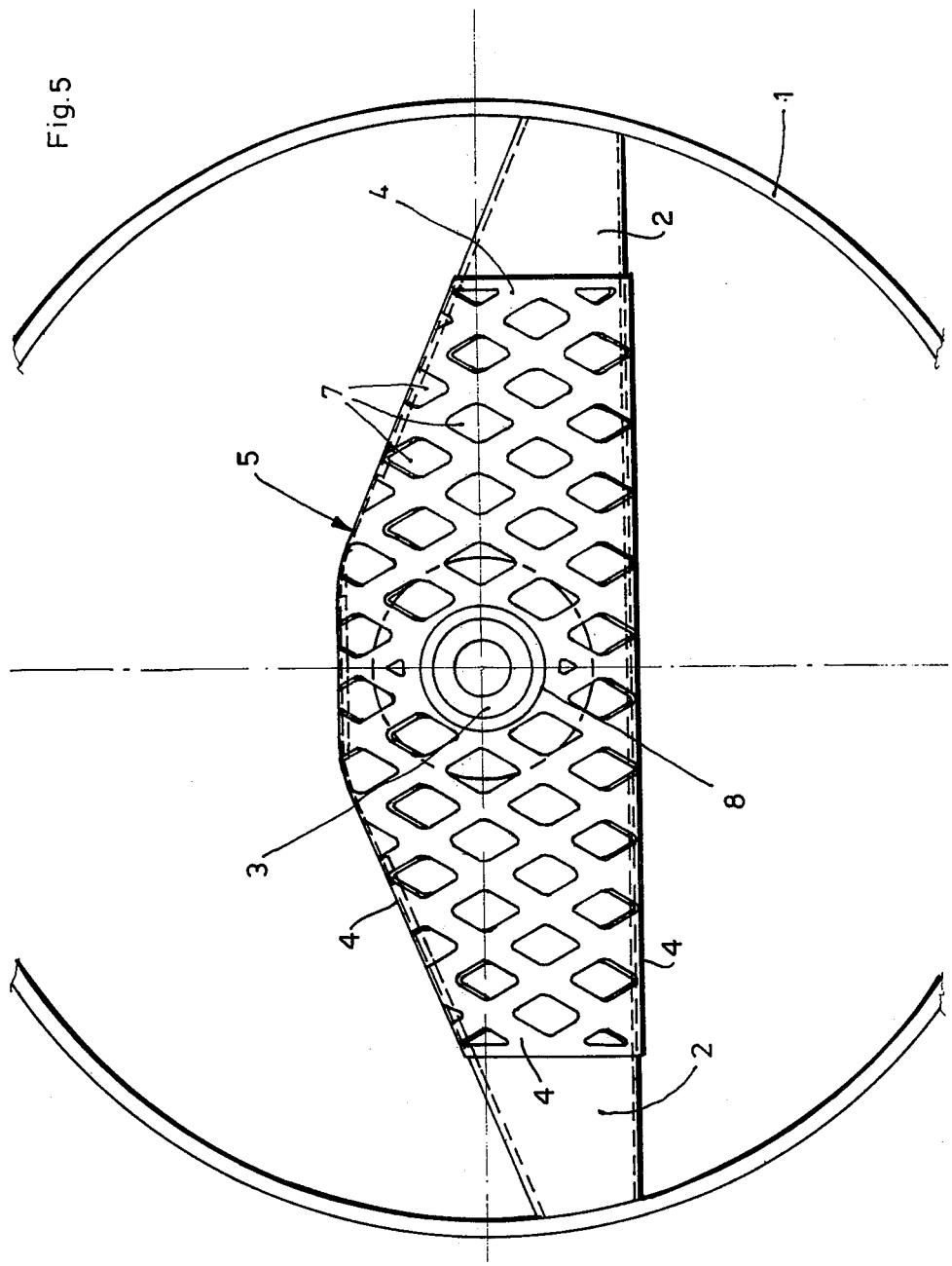

SAFETY STEERING WHEEL FOR VEHICLES

BACKGROUND OF THE INVENTION

This invention relates to a safety steering wheel for vehicles, particularly automobiles, having a deformation member which is yieldable and which absorbs the energy of the impact of a portion of the body of the driver.

Safety steering wheels provided with a deformation member are known in the art. They have the purpose to absorb the kinetic energy of the driver who may be thrown against the steering wheel during violent impact accidents, thereby to prevent great injury. Some of the known safety steering wheels include a deformation member which consists of a special building element which may, for example, be rod shaped. This has been disclosed in the prior German published application DOS 1,912,528. This building element is disposed between the spokes and the steering hub or where the steering wheel is dish-shaped it is freely disposed on the hub and extends in the direction of the steering wheel. In this known construction all building elements to the steering wheel with respect to their construction, as well as concerning the function to be performed by each element, are precisely separated from each other. Thus, the deformation member solely serves the purpose to absorb the energy caused by an impact of the body. On the other hand, the steering wheel rim with the spokes connecting it to the steering hub serves the purpose to transmit the steering force exerted on the steering rim toward the steering hub. Due to this sharp separation of the functions of the individual building elements a considerable expenditure results, as well as an unfavorable utilization of the material.

Furthermore, some of the known safety steering wheels are designed to accept the impact of the upper body of the driver or passenger. Since, however, more and more people utilize safety belts the impact caused by an accident is not generally due to the impact of the upper body of the driver or passenger, but the impact of the relatively free movable head which is not restrained. Impact of the head of the driver onto the relatively rigid spokes of the steering wheel, however, may cause considerable injury.

Another safety steering wheel which is designed to overcome this problem has been disclosed in the German published application DOS 1,630,355. Here the deformation member is formed by the spokes connecting the rim of the steering wheel to the hub. This deformation member is designed to have less rigidity in a lateral direction so that it will transmit the steering forces, but permit the steering rim to move toward the hub in case of an impact.

U.S. Pat. No. 3,270,581 discloses a safety steering wheel where the deformation member is directly formed by the spokes interconnecting the steering rim with the hub. In this case, however, the resilience of the spokes also exists during turning movement as well as under bodily impact. This, of course, may cause accidents because due to the less rigid connection between the steering rim and the hub, the turning movements may require more movement of the steering rim.

It is accordingly an object of the present invention to provide a safety steering wheel having a deformation member integrally connected to the spokes connecting the rim with the hub of the steering wheel.

A further object of the invention is to provide a safety steering wheel having a deformation member which is yieldable and capable of absorbing energy and which requires less expenditure and a better utilization of material and which is capable of retarding the impact of the head of the driver within the range of the spokes of the steering wheel.

SUMMARY OF THE INVENTION

In view of the fact that the deformation member according to the invention is integrally connected to the spokes, the deformation member takes over a portion of the functions of the spokes. Accordingly, the actual spokes are less stressed with respect to their rigidity so that they may be manufactured lighter and with reduced cost. At the same time since the deformation member effectively forms a portion of the spokes, this will reduce the danger of causing serious injury when the head of the driver or passenger impacts within the range of the spokes of a steering wheel.

According to the preferred embodiment of the invention the deformation member consists of sheet metal extending over the spokes and the steering hub and having lateral edges connected to the spokes. The deformation member may extend through the steering rim following the shape of the spokes and the sheet metal may have a U-shaped cross-section. Particularly simple in the manufacture and having a very efficient energy absorption is a deformation member consisting of sheet metal having rhombiclike cutouts.

In order to obtain a particularly favorable effect of the deformation member during impact of the head of the driver or passenger of the car, it is proposed for a steering wheel having two spokes extending in a horizontal direction so that the upper leg of the U-shaped deformation member be inclined.

BRIEF DESCRIPTION OF THE DRAWINGS

FIG. 3 is a sectional view through the steering hub along the lines III — III of FIG. 1;

FIG. 4 is a cross-sectional view through the body of the spokes taken along the lines IV — IV of FIG. 2; and FIG. 5 is a front elevational view similar to that of FIG. 1 of a modified safety steering wheel in accordance with the present invention.

DESCRIPTION OF THE PREFERRED EMBODIMENTS

Figure 1:
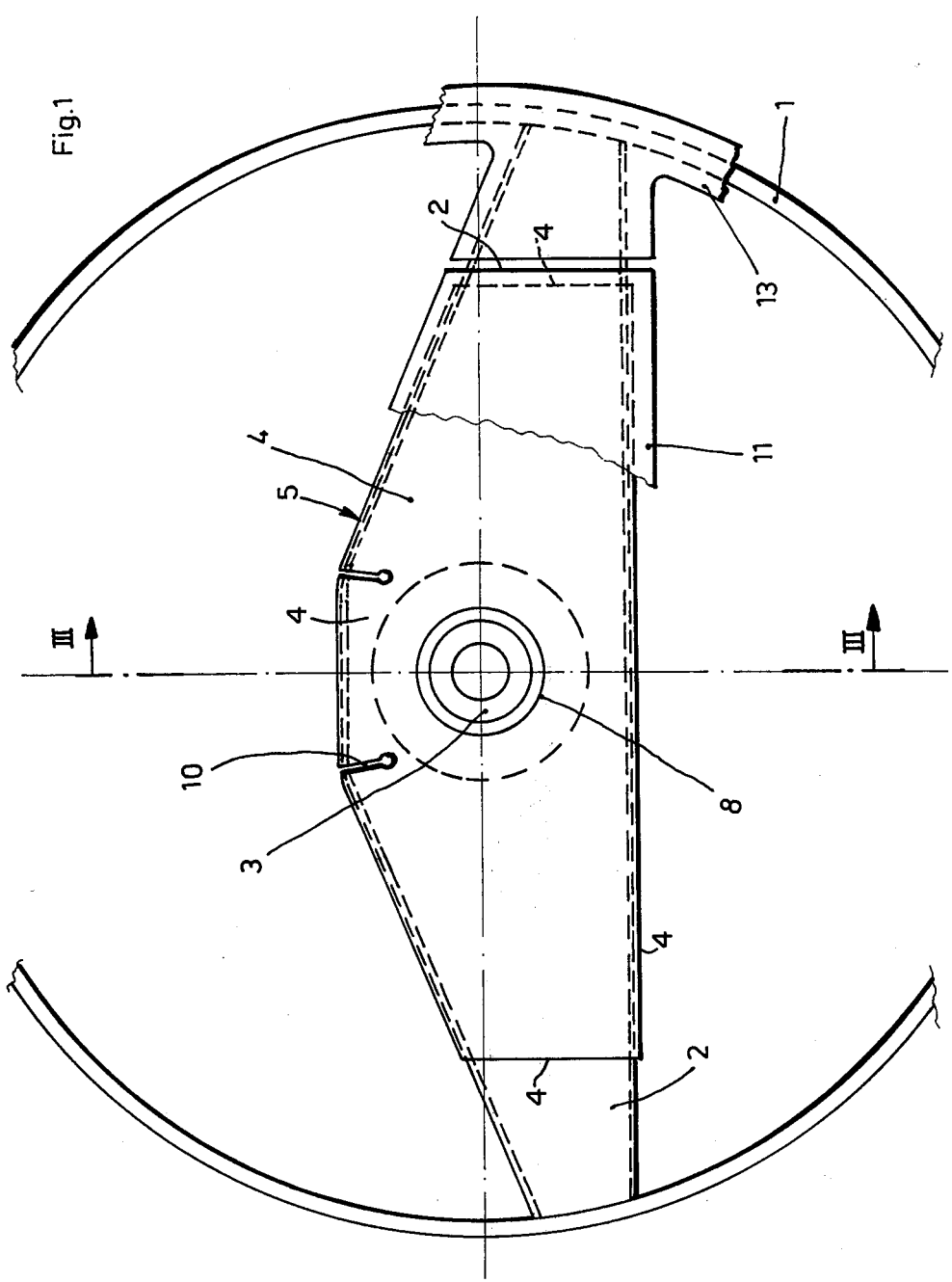
FIG. 1 is a front elevation view of a safety steering wheel in accordance with the present invention.
Figure 2:
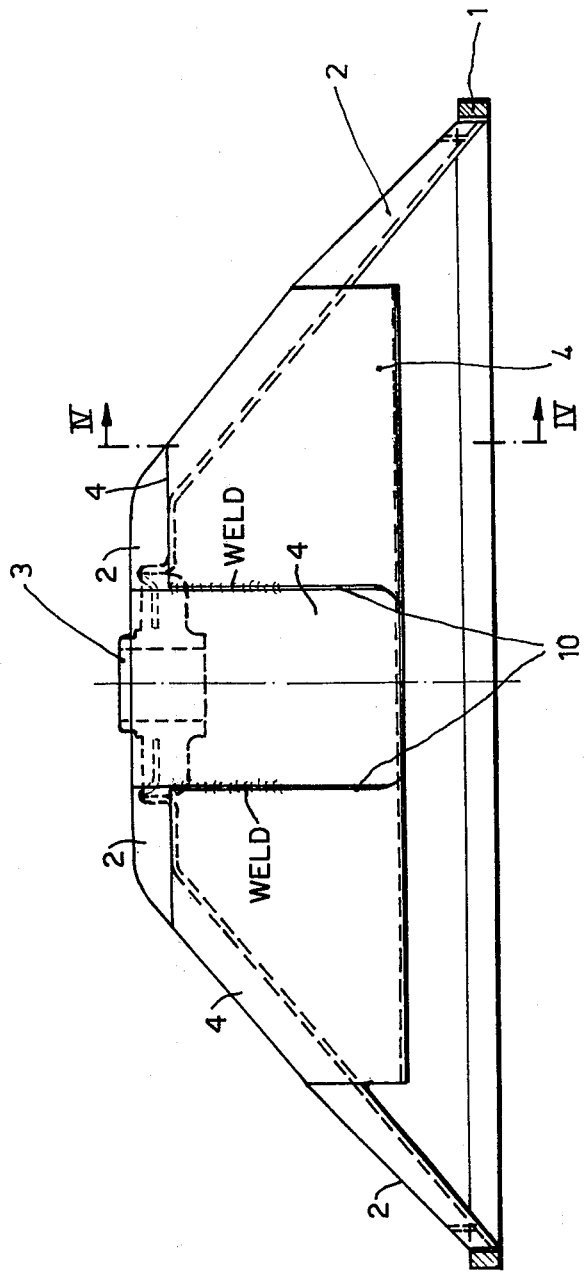
FIG. 2 is a top plan view of the safety steering wheel of FIG. 1.

Referring now to the drawings, there is illustrated a safety steering wheel of the type having two spokes and having the shape of a dish. The safety steering wheel includes a circular steering rim 1 which is connected by means of spokes 2 extending essentially in a diagonal direction with a steering hub 3. Integrally connected to the spoke body 2, there is provided a deformation member 4 which consists of a U-shaped piece of sheet metal extending over the spokes 2 and the steering hub 3. As shown in FIGS. 3 and 4, the piece of sheet metal 4 is connected at its lateral edges with the bent over edges of the spokes 2 which may, for example, be effected by welding. Also, the spokes 2 are connected on the one hand to the steering rim 1 and on the other hand to a ring 9 (see FIG. 3) which is sunk or countersunk into the steering hub 3 by welding.

At the side of the U-shaped deformation member 4 facing the driver there is provided a plane surface, the center of which is provided with a bore 8 for extending therethrough the operating mechanism for the signal horn. The width of the spokes 2 and accordingly that of the deformation member 4 is reduced from the area to which it is secured at the steering rim 1 in the direction toward the center of the steering wheel. When the steering wheel is in its normal position the lower leg of the spokes 2 and the deformation member 4 extends in a horizontal direction while the upper leg forms an acute angle with respect to a horizontal line with the exception of an intermediate range corresponding to the diameter of the steering hub 3. Furthermore, the upper leg 5 of the deformation member 4 has an inclined surface 6 as will be readily seen from the cross-sections of the deformation member illustrated in FIGS. 3 and 4. This inclined surface is provided not only for reasons of an optically harmonic appearance of the deformation member, but also to provide a more favorable impact relationship for the head of the driver or passenger.

As shown in FIG. 5, the deformation member 4 may consist of thin sheet metal provided with rhombic cutouts 7. These rhombic-like cutouts have been found to be very suitable for the deformation member because they permit a greater thickness of the sheet metal combined with a more favorable impact absorption. This in turn permits an easier fabrication, particularly a better securing of the sheet metal body of the deformation member by means of welding. The manufacture of such sheet metal provided with rhombic-like apertures may simply be effected in accordance with the known lattice manufacture by drawing a sheet provided with slit-like perforations.

Slits 10 may be disposed at the upper leg of the deformation member. These make possible a transition toward a reduced cross-section during fabrication.

The steering rim 1 may have an approximately rectangular cross-section having a radial width larger than its axial width. In this manner it is achieved that the steering rim may be relatively easily bent during impact of the head of the driver or passenger in a radial direction while the steering rim is relatively more resistant with respect to axially directed forces.

As illustrated in FIGS. 1 and 4, the steering wheel may also be provided with a cover or casing. Thus, as shown in FIG. 1, the deformation member 4 may be surrounded by a synthetic material cap 11 shown more particularly in FIG. 4 having a hook shaped portion 12 which surrounds the lower edges of the legs of the spokes 2. Similar to the synthetic material cap 11 there may be provided a casing 13 surrounding the spokes 2 and the steering rim 1 which may, for example, consist of a rubber-like material sprayed over the rim 1 and the spokes 2.

It should be noted that the drawing only illustrates an exemplary form of the present invention and that the invention is not limited to this example.

What is claimed is:

1. Safety steering wheel for vehicles of the type having a deformation member which absorbs energy during impact of a passenger, said safety steering wheel comprising:
   a steering rim;
   a steering hub;
   spokes interconnecting said rim to said hub; and
   a sheet metal deformation member integrally connected to said spokes and extending over said spokes and said hub, the lateral edges of said sheet metal deformation member being connected with said spokes.

2. Safety steering wheel as defined in claim 1 where said deformation member extends diagonally through said rim and along said spokes.

3. Safety steering wheel as defined in claim 1 wherein said sheet metal forming said deformation member has a U-shaped cross-section.

4. Safety steering wheel as defined in claim 1 wherein said sheet metal forming said deformation member is provided with rhombic-like cutouts.

* * * * *